United States Patent [19]

Ghavamikia

[11] Patent Number: 4,610,835
[45] Date of Patent: Sep. 9, 1986

[54] METHOD OF PRODUCING GLASS FIBER MAT REINFORCED PLASTIC PANELS WITH SMOOTH SURFACES

[75] Inventor: Hamid Ghavamikia, Sterling Heights, Mich.

[73] Assignee: General Motors Corporation, Detroit, Mich.

[21] Appl. No.: 669,824

[22] Filed: Nov. 9, 1984

[51] Int. Cl.$^4$ ............................................. B28B 9/00
[52] U.S. Cl. .................................. 264/250; 264/255; 264/257; 264/261
[58] Field of Search ............... 264/257, 255, 250, 261

[56] References Cited

U.S. PATENT DOCUMENTS

| | | | |
|---|---|---|---|
| 4,076,788 | 2/1978 | Ditto | 255/264 |
| 4,239,796 | 12/1980 | Shanoski et al. | 428/315 |
| 4,245,006 | 1/1983 | Shanoski | 428/423 |
| 4,259,274 | 3/1981 | Tiitola | 264/46.5 |
| 4,282,285 | 8/1981 | Mohiuddin | 428/315 |
| 4,331,735 | 5/1982 | Shanoski | 428/423.7 |
| 4,356,230 | 10/1982 | Emanuel et al. | 428/290 |
| 4,367,192 | 1/1983 | Arnason | 264/255 |
| 4,414,173 | 11/1983 | Cobbledick et al. | 264/257 |
| 4,438,062 | 3/1984 | Griffith et al. | 264/255 |
| 4,477,405 | 10/1984 | Makhlouf et al. | 264/250 |

FOREIGN PATENT DOCUMENTS

| | | | |
|---|---|---|---|
| 0053833 | 6/1982 | European Pat. Off. | 264/261 |
| 1420867 | 1/1976 | United Kingdom . | |

OTHER PUBLICATIONS

"Class A Finish on SMC", Plastics World, Mar. 1978, pp. 48-51.

Primary Examiner—Donald Czaja
Assistant Examiner—Mary Lynn Fertig
Attorney, Agent, or Firm—Randy W. Tung

[57] ABSTRACT

A method of producing a smooth surface on a premolded glass fiber mat reinforced plastic panel where protruding fibers would otherwise produce a rough surface. The method is practiced by coating the surface of a premolded glass fiber mat reinforced plastic panel maintained at room temperature with a room temperature curable polyurethane composition, and applying molding pressure on the coated surface to cause the coating resin to flow and fill the valleys between the protruding fibers. The molding pressure is released while the coating resin is still in its fluid state. A finished, smooth panel is made by this process which can be readily painted and used as an automotive exterior body panel. Optionally, a layer of a predecorated sheet material can first be placed in the upper mold cavity of a mold, then compressed against a premolded panel positioned in the lower mold cavity with a layer of coating resin sandwiched in between. A finished, predecorated panel having a predecorated sheet permanently bonded to the panel is produced by this process. The finished, predecorated panel can be readily used as an automotive exterior body panel without further painting or decorating.

2 Claims, 8 Drawing Figures

METHOD OF PRODUCING GLASS FIBER MAT REINFORCED PLASTIC PANELS WITH SMOOTH SURFACES

FIELD OF THE INVENTION

The present invention generally relates to the molding of glass fiber reinforced plastic panels and, more particularly, is concerned with a method of producing a smooth surface layer on the surface of a premolded glass fiber mat reinforced plastic panel where protruding fibers would otherwise produce a rough surface.

BACKGROUND OF THE INVENTION

Glass fiber reinforced plastics have been used widely in recent years in the automotive industry. These plastics include sheet molding compound, glass fiber reinforced reaction injection moldable materials and various other glass fiber reinforced plastics. The advantages of lightweight, high strength, rustproofing and relatively low cost make them ideal for many automotive exterior body panel applications.

Of these materials, the reinforced reaction injection moldable material (RRIM) is of particular interest to the automotive industry since they can be processed economically with low cost equipment. RRIM materials filled with milled glass have greatly improved stiffness and are suitable for applications where structural integrity is required. These materials are also suitable for use in large automobile exterior body panels since they produce readily paintable surfaces. However, one inherent drawback of these RRIM materials is that they have a relatively high coefficient of thermal expansion, i.e., $33 \times 10^{-6}/°C$. in the direction parallel to flow, $108 \times 10^{-6}/°C$. in the direction perpendicular to flow, when compared to that of only $12 \times 10^{-6}/°C$. for steel. Consequently, when used in relatively large and flat panels where the service life of the part covers a wide temperature span (e.g., $-20°$ C. to $+70°$ C.), the dimensional stability of the RRIM materials is often less than desirable.

To meet the requirement of dimensional stability on a large body panel, a new type of glass fiber reinforced RIM material was subsequently developed by using a glass fiber mat of continuous glass. The presence of a glass fiber mat embedded in a large RIM part through the whole area dramatically improves its dimensional stability. This is achieved while all the other desirable mechanical and processing properties are maintained.

The processing of glass fiber mat reinforced RIM is relatively simple. It involves placing a glass fiber mat in a mold cavity and shooting RIM material into the closed mold so that the RIM material is soaked through the mat. A completed part is then removed after it is cured in the mold.

A typical RIM used in this process is a polyurethane based material produced from two components: an isocyanate and a polyol. The in-mold pressure normally seen in the RIM process is less than 50 psi, requiring much less clamping force than other processes.

The glass mat reinforced RIM material is especially suitable for large body panels such as door panels or quarter panels on a vehicle. The dimensional stability of a resulting door panel or quarter panel is greatly improved while the traditional characteristics of RRIM, i.e., stiffness, strength, and ease of processing are maintained. The coefficient of thermal expansion of a glass mat reinforced RIM material is only one-third ($13 \times 10^{-6}/°C$.) of that for a RRIM material filled with milled glass. As a matter of fact, its thermal stability property is even superior to that of aluminum.

In the processing of glass fiber mat reinforced RIM parts where aesthetic property is important, however, a new problem has arisen. This is the glass fiber readout problem observed in the surface layer of a glass mat reinforced RIM part. The readout problem is caused largely by the presence of the continuous glass fiber in the surface layer of the panel. When a panel is situated in a mold under compression, the resin material located between the panel surface and a glass fiber in the surface layer of the panel is under higher pressure than the resin material located not adjacent to a glass fiber. As a consequence, when the part is demolded, the cured viscoelastic resin material located adjacent to a glass fiber will expand more than the resin material not adjacent to a glass fiber. This results in a panel with a surface showing protruded contours of various glass fibers which are located immediately below the surface of the panel, commonly known as the glass fiber readout problem.

Numerous efforts have been made to correct this glass fiber readout problem. However, none of them was found to work satisfactory in hiding the glass readout on the surface of a RIM part. For instance, an in-mold coating process used on a conventional RIM part disclosed in U.S. Pat. No. 4,282,285 was found inadequate to correct the problem. This fiber readout problem makes the glass fiber mat reinforced RIM material unsuitable for exterior automobile body panel applications for aesthetic reasons.

It is therefore an object of the present invention to provide a method of producing glass mat reinforced RIM panels with smooth surfaces without the fiber readout problem.

It is yet another object of the present invention to provide a method of making glass mat reinforced RIM panels for automotive exterior body panel applications having smooth surfaces adequate to obtain a class-A painted surface.

It is a further objective of the present invention to provide a method of producing glass mat reinforced RIM panels for automotive exterior body panel applications having smooth and predecorated surfaces that do not require further painting or decorating.

SUMMARY OF THE INVENTION

In accordance with a preferred practice of my invention, a method of producing a smooth surface on a premolded glass fiber mat reinforced RIM panel where protruding fibers would otherwise produce a rough surface can be carried out by the following operative steps. First, the rough surface of a premolded panel is coated and leveled off with a liquid mixture of a room temperature curable thermoset polymeric composition. The thickness of the coating required is at least adequate to fill up the valleys created between the protruding fibers in the surface of the panel. The temperature of the premolded panel prior to and during this coating operation must be at room temperature or not significantly higher than room temperature, i.e., in the range of $70° \sim 100°$ F. This is a critical requirement which must be met in order to avoid the glass fiber readout problem. The second step of the process involves the application of pressure on the coated surface causing the coating resin to fill the valleys between the protruding fibers and to flow evenly to cover the entire surface of the premolded panel. This pressure is subsequently relieved when the coating is still in its fluid state such that a smooth surface can be obtained by the flowing of the resin material in the top layer of the coating. The coating composition is then allowed to cure and harden.

The present invention may be practiced, for example, by placing and positioning a premolded glass fiber mat reinforced polymeric panel into the cavity of the lower mold piece of a matched mold, coating the surface of the premolded panel maintained at room temperature with a room temperature curable polyurethane composition, then applying pressure on the coated surface through the upper mold piece of the matched mold to cause the coating to flow and fill the valleys between the protruding fibers. This pressure applied through the upper mold piece makes the coating material flow evenly to cover the entire surface of the premolded panel. The molding pressure is released while the coating material is still in its fluid state. The coating composition is allowed to flow on a small scale to form a smooth surface and to cure under the dead weight (less than 1 psi) of the upper mold piece.

Optionally, a layer of a predecorated sheet material can first be placed in the upper mold cavity with the decorated side of the sheet facing the mold. The two mold members are then compressed together with the resin material sandwiched between the predecorated sheet and the premolded panel. When the pressure on the partially cured resin is released it expands or flows to fully cover the glass fibers in the surface of the premolded panel and to provide a smooth surface to which the predecorated sheet adheres. A finished, predecorated panel having a predecorated sheet permanently bonded to the panel is produced by this process. The finished panel can be readily used as an automotive exterior body panel without further painting or decorating.

DESCRIPTION OF THE DRAWINGS

Other objects, features and advantages of the present invention will become apparent upon consideration of the specification and the appended drawings, in which.

DESCRIPTION OF THE PREFERRED EMBODIMENT

One major obstacle in using glass fiber mat reinforced plastic panels in automoblie exterior body panels is the fiber readout problem. The problem is known to be caused by the large differences that exist between the thermal expansion properties of the glass and of the resin. A molded part having a coating applied at molding temperature (150° C.) shows a smooth surface when it is still hot, but as it cools down to room temperature, the fiber readout appears on the surface. This is a reversible phenomenon in that upon heating to the mold temperature, the fiber readout disappears but only to reappear as the sample is cooled back to room temperature.

My invention is a unique technique which allows for the production of glass fiber mat reinforced plastic panels with smooth surfaces. The technique is to make a premolded panel by the conventional method at elevated temperature for rapid production, and then let it cool to room temperature. A room temperature part is then placed in a cold mold and a thin layer of a thermoset resin at room temperature is applied on top of the part. A 300 psi pressure is momentarily applied on the coated part and then released. The coating is then left to harden under room temperature and near zero molding pressure conditions. Note that room temperature specified here includes a temperature in the range between 70° to 100° F. which is frequently seen in a factory environment.

Figure 1:
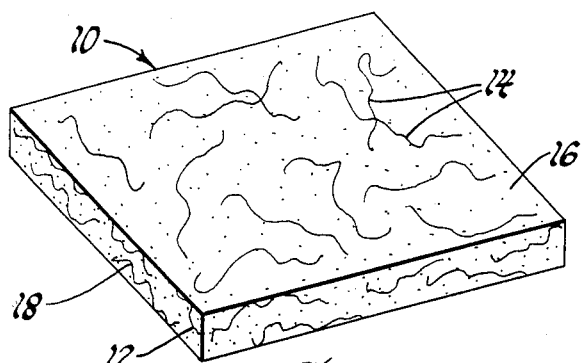
FIG. 1 is a perspective view of a premolded glass fiber mat reinforced RIM panel showing fiber readout in the surface layer of the panel.
Figure 2:
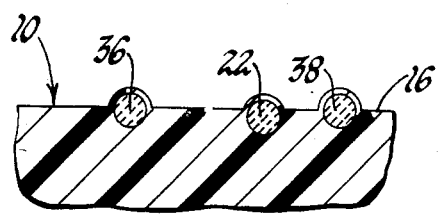
FIG. 2 is a schematic of an enlarged cross-sectional view of the panel in FIG. 1 showing the protruding fibers partially embedded in the surface layer of the RIM material.

Referring initially to FIG. 1, a glass fiber mat reinforced RIM panel 10 is shown having protruding glass fibers 14 in the surface layer 16 of the RIM panel. The continuous glass fiber mat 18 is also visible through the thickness 12 of the panel. The technology of making continuous glass fiber mats is well known today and can be found in many technical publications. For instance, it is described in the *Encyclopedia of Polymer Science and Technology, Vol. 6, page* 639. A schematic showing an enlarged cross-sectional view of panel 10 (FIG. 1) is shown in FIG. 2. The protruding fibers 22, 38 and 36 are shown in the surface layer 16 of RIM panel 10.

Figure 3:
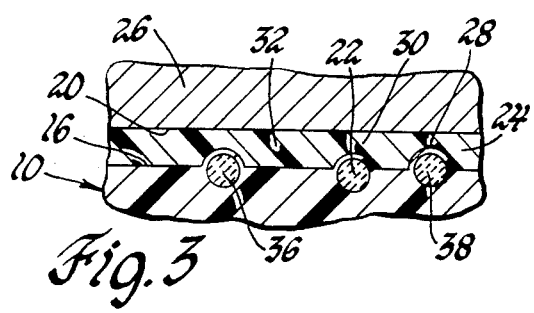
FIG. 3 is a schematic of an enlarged cross-sectional view of the panel in FIG. 1 after the rough surface was coated with a urethane composition and held under a molding pressure of 300 psi.

FIG. 3 shows a premolded panel 10 coated with a layer 24 of polyurethane composition while being pressed under pressure at the mold surface 20 of mold 26. The coating can be applied by either free pour into an open mold or by injection under pressure into a closed mold. The coating material at 28 is under a higher compressive state than the coating material at 30 due to the different position of the protruding fibers. The coating resin material contained at 28 between mold surface 20 and fiber 38 has lesser room to expand than the resin material at 30 contained between mold surface 20 and fiber 22. Similarly, the resin material contained at 30 is under a higher compressive state than the resin material contained at 32. Therefore, when mold pressure applied at mold surface 20 is released, the resin material at 28 and 30 will expand back more than the resin material at 32 because of their respectively higher compressive state. This causes surface 34 (FIG.

Figure 4:
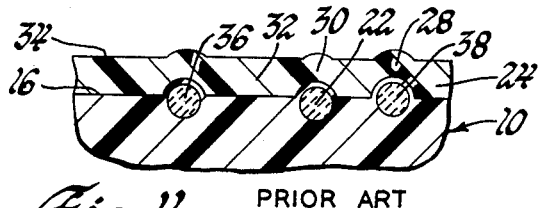
FIG. 4 is a schematic of an enlarged cross-sectional view of the panel in FIG. 1 after coating with a polyurethane composition where the premolded panel was maintained at a temperature of 150° C. prior to and during the coating operation.

4) of the coating material to assume the profile of the protruding fibers at surface layer 16 of the RIM material. FIG. 4 depicts the situation where a coating material is applied on a hot premolded panel or when the panel is held under pressure during the curing of urethane coating composition. It also explains the phenomenon that when a premolded glass fiber mat reinforced polymeric panel is coated with a urethane composition at the molding temperature of the panel, or when the coating composition is held under molding pressure until it reaches a cured state, the coated panel appears to have a smooth surface immediately after demolding when the panel is still hot. However, when the panel is cooled down to ambient temperature, during which time the resin material having time to expand to its uncompressed state, fiber readout appears in the coated surface. This phenomenon results from the viscoelastic behavior of the resin material.

Figure 5:
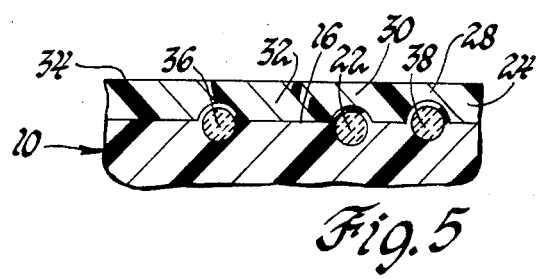
FIG. 5 is the same as FIG. 4 except that the premolded panel was maintained at ambient temperature prior to and during the coating operation and at less than 1 psi pressure.

To avoid the fiber readout problem, a novel technique is provided by the present invention. In FIG. 5, a premolded glass fiber mat reinforced polymeric panel is coated at ambient temperature with a room temperature curable polyurethane composition. The coating material at different locations 28, 30 and 32 (FIG. 5) is in the same compressive state. This is achieved by releasing the molding pressure (300 psi) at mold surface 20 (FIG. 3) when the coating layer 24 is still in its fluid state and allowing the coating resin to flow under near zero pressure forming a smooth surface. The end result is that the top surface 34 of the coating remains smooth after the coating composition is fully cured.

Figure 6:
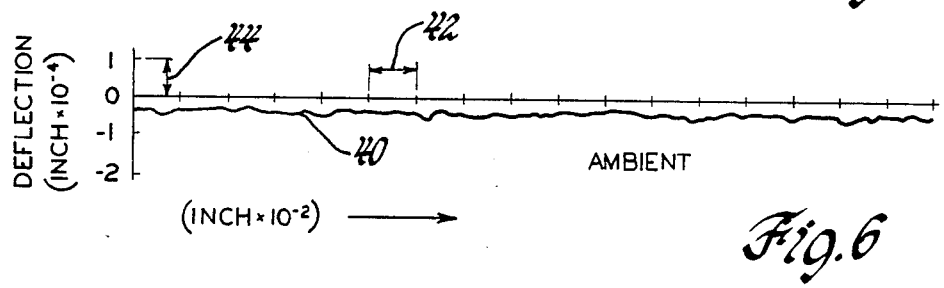
FIG. 6 is a schematic of a profilometer measurement obtained on the surface of a panel that was coated at ambient temperature and cured under less than 1 psi pressure.
Figure 7:
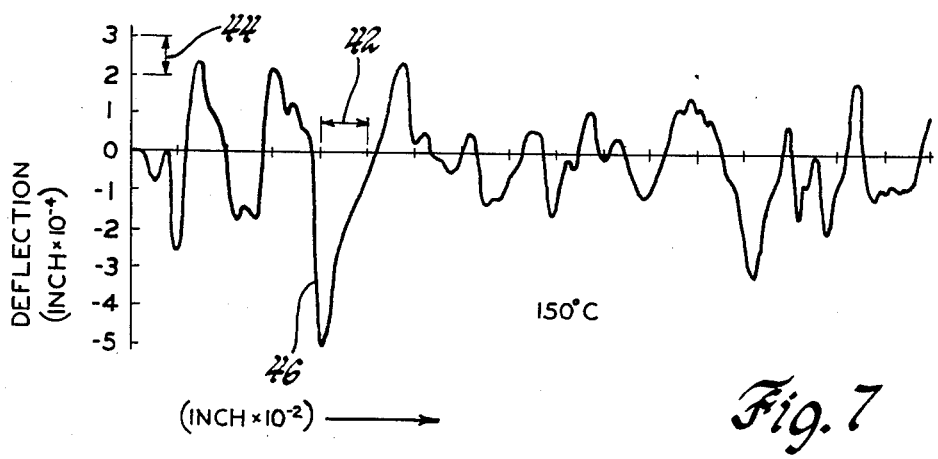
FIG. 7 is the same as FIG. 6 except that the premolded panel was maintained at 150° C. prior to and during the coating operation.

To further demonstrate the differences in coating a room temperature panel and coating a high temperature panel, surface profilometer diagrams were obtained and illustrated in FIGS. 6 and 7. FIG. 6 shows a profilometer trace 40 obtained on a polyurethane composition coated surface of a premolded glass fiber mat reinforced RIM panel. Note that each division 42 in the horizontal axis represents 0.01 inch, while each division 44 in the vertical axis represents 0.0001 inch. The small deflection in the profilometer trace 40 indicates that a smooth surface was obtained on the coated panel. In contrast, FIG. 7 shwos a profilometer trace 46 obtained on a polyurethane coated surface where the premolded panel was maintained at 150° C. prior to and during the coating operation. Fiber readout problems are apparent from the large deflections observed in the profilometer trace 46. It is to be noted that the maximum deflection observed in FIG. 7 is approximately 0.0005 inch which agrees well with the true glass fiber radius ranging between 0.0005 to 0.002 inch. The coating thickness applied in these samples was approximately 0.005 inch.

Figure 8:
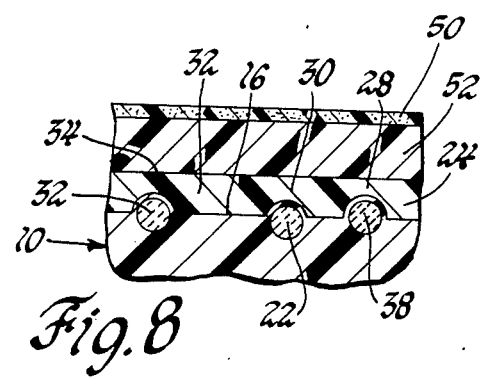
FIG. 8 is a schematic of an enlarged cross-sectional view of a premolded glass fiber reinforced panel having a prepainted sheet laminated thereon by a polyurethane resin layer.

Optionally, a layer of a prepainted sheet material may be placed in the upper mold cavity with the painted side facing the mold before the resin material is compressed between the two molds. The resin material is chosen such that it will permanently bond to both the sheet material and the panel material. A panel having a smooth decorated surface is produced which can be readily installed on a vehicle without further painting or decorating. A schematic of an enlarged cross-sectional view of a premolded glass fiber reinforced panel having a prepainted sheet laminated thereon by a polyurethane resin layer is shown in FIG. 8. A paint layer 50 is first sprayed on a thermoplastic sheet 52 and oven baked and cured. The sheet 52 is then laminated to the premolded panel 10 by the polyurethane layer 24.

EXAMPLE I

A urethane resin was chosen with the formulation shown in Table I. The chemicals used were obtained from the following sources, NIAX 11-34 Polyol from Union Carbide Corporation, ISONATE 181 from Upjohn Corporation, Ethylene Glycol grade AR and FOMREZ UL-29, an alkltin mercaptide from Witco Co.

TABLE I

| Component | Wt % |
| --- | --- |
| Polyol | 50 |
| Isonate | 44 |
| Ethylene Glycol | 6 |
| FOMREZ UL-29 | 0.1 |

Two plies of a glass mat obtained from Owens Corning Fiberglas (#M-8605, density of 0.04 g/cm$^2$) are wet with a RIM resin composition shown in Table I. They are then press molded at 67° C. for ten minutes to make a plaque in the dimension of 150×150×3 mm. The surface of the plaque at this stage after cooled to room temperature shows considerable amount of fiber readout (similar to that illustrated in FIG. 1).

The surface of the molded plaque was then cleaned with isopropanol and placed in a mold maintained at room temperature. A urethane resin with the formulation shown in Table II is poured over the plaque and then press molded at room temperature and 300 psi pressure. Excess resin was pushed out of the mold. The 300 psi pressure was applied only for ten seconds and then released. The release of the pressure before the resin cures is a key factor in this process. If the molding pressure is kept at 300 psi, the molded part will still show fiber readout at the end of the process. The reason is that the portion of the coating material directly facing the fibers experience a higher pressure and remain in a highly compressed state during the molding process. As the pressure is released at the end of the molding cycle, the compressed regions would expand back and show fiber readout on the surface.

TABLE II

| Component | Wt % |
| --- | --- |
| Polyol | 50 |
| Isonate | 44 |
| Ethylene Glycol | 6 |
| FOMREZ UL-29 | 0.5 |

The novel technique disclosed in the present invention requires the release of the molding pressure just prior to the hardening of the resin. A surface layer of resin material is maintained at a uniform low pressure (e.g., less than 1 psi) by the dead weight of the upper mold piece such that the resin can flow on a small scale and thereby produce a smooth surface. The purpose of applying a high molding pressure at the start of the molding is to ensure that resin flows and fills the valleys between the protruding fibers in the surface. We have found that a 300 psi molding pressure produces a coating thickness of approximately 0.005 inch.

After the initial molding pressure is released, the part is left in the mold under the dead weight of the mold piece to cure for twenty minutes. The surface of the part after removal from the mold showed no fiber readout. It should be noted that other room temperature curable urethane compositions having a faster cure rate can be used to shorten the total cycle time required. Moreover, other room temperature curable thermoset compositions may also be used in place of polyurethane. An example of such a composition is an epoxy based material.

In addition to concealing the fiber readout, this novel technique also provides a surface that is free from porosity since the fibers are kept away from the surface. In the case where the urethane coated surface will be painted in a subsequent operation, the composition of the coating layer can be chosen such that it will chemically match the substrate (the premolded panel) and the paint so that the need for using primer is eliminated.

EXAMPLE II

In this example, a prepainted thermoplastic sheet is laminated to the rough surface of a premmolded glass fiber mat reinforced panel by a layer of polyurethane coating resin. The polyurethane chemicals used for the panel and the coating resin are the same as that used in Example I (Tables I and II). The thermoplastic carrier film in the thickness of 0.01 inch is a modified PET material (PETG 6763) supplied by Eastman Chemical Products. Other suitable plastic sheet or film may also be used.

A premolded glass fiber mat reinforced panel is first prepared by the method described as that described in Example I. The unpainted side of a carrier film was then cleaned with isopropanol and placed in a mold with the painted side facing the mold. A urethane resin with the formulation shown in Table II was poured over the film. The surface of a premolded panel was also cleaned with isopropanol and placed in the mold with the cleaned surface facing the resin. The whole system was then press molded at room temperature. Excess resin was pushed out of the mold from between the molding and the sheet. A 300 psi pressure was applied for 10 seconds and released. The release of the pressure before the resin hardens is a key factor in this process. If the pressure is kept high, the molded part would still show fiber readout at the end of the process. The reason, as explained before, is that the parts of the material directly facing the fibers experience a much higher pressure and remain considerably compressed during the process. As the pressure is released at the end, the compressed regions would expand back and show fiber readout on the surface. After the pressure was released, the part was left in the mold to cure for 20 minutes. The surface of the part after being removed from the mold showed no fiber readout. This is because the coating layer provides a base for the sheet to fully cover the glass fibers in the surface of the premolded panel and a smooth surface to which the predecorated sheet adheres.

While my invention has been described in terms of two preferred embodiments thereof, it is to be appreciated that those skilled in the art will readily apply these teachings to other possible variations of the invention.

The embodiments of the invention in which an exclusive property or privilege is claimed are defined as follows:

1. A method of producing a smooth surface layer on the surface of a premolded glass fiber mat reinforced polyurethane panel situated in a matched mold where protruding fibers produce a rough surface, said method comprising:
   positioning said premolded panel in the cavity of the lower mold piece of said matched mold,
   coating and leveling off the rough surface of said premolded panel with a liquid mixture of a room temperature curable polyurethane composition such that the thickness of said coating is at least adequate to fill the valleys created between the protruding fibers in the surface, said premolded panel being at room temperature prior to and during said coating operation,
   applying sufficient pressure on said coated surface through an upper mold piece positioned on said panel to cause said coating to fill the valleys between the protruding fibers and to flow evenly to cover the entire surface of said panel, and
   relieving said pressure while said coating is still in its fluid state and allowing said coating composition to sufficiently harden under the dead weight of said upper mold piece, whereby the cured coating provides a smooth surface layer on said panel that masks said protruding fibers.

2. A method of producing a smooth decorative surface by laminating a predecorated carrier film having a first decorated surface and a second undecorated surface to the surface of a premolded glass fiber mat reinforced polyurethane panel where protruding fibers produce a rough surface, said method when practiced in a matched mold comprising the steps of:
   positioning said predecorated carrier film into the first half of said matched mold with the first decorated surface of the carrier film facing the mold surface;
   applying a layer of a room temperature curable thermoset polymeric resin coating to the second undecorated surface of the carrier film to a minimum thickness adequate to substantially cover all the valleys created between the protruding fibers in the surface layer of said premolded panel in a subsequent operation;
   positioning said premolded panel over the coating resin, said panel being at room temperature prior to and during said lamination process;
   applying sufficient pressure on said premolded panel through the second half of the matched mold positioned thereon to cause said coating resin to substantially fill the valleys between the protruding fibers and to flow evenly to cover the entire surface of said panel; and
   relieving said pressure while said coating resin is still in its fluid state and allowing said coating resin to sufficiently harden under the dead weight of said second half of the matched mold, whereby said decorative layer is bonded to the rough surface of the premolded panel and said resin layer is evenly distributed between said decorative layer and said rough surface to hide the protruding glass fibers.

* * * * *